UNITED STATES PATENT OFFICE.

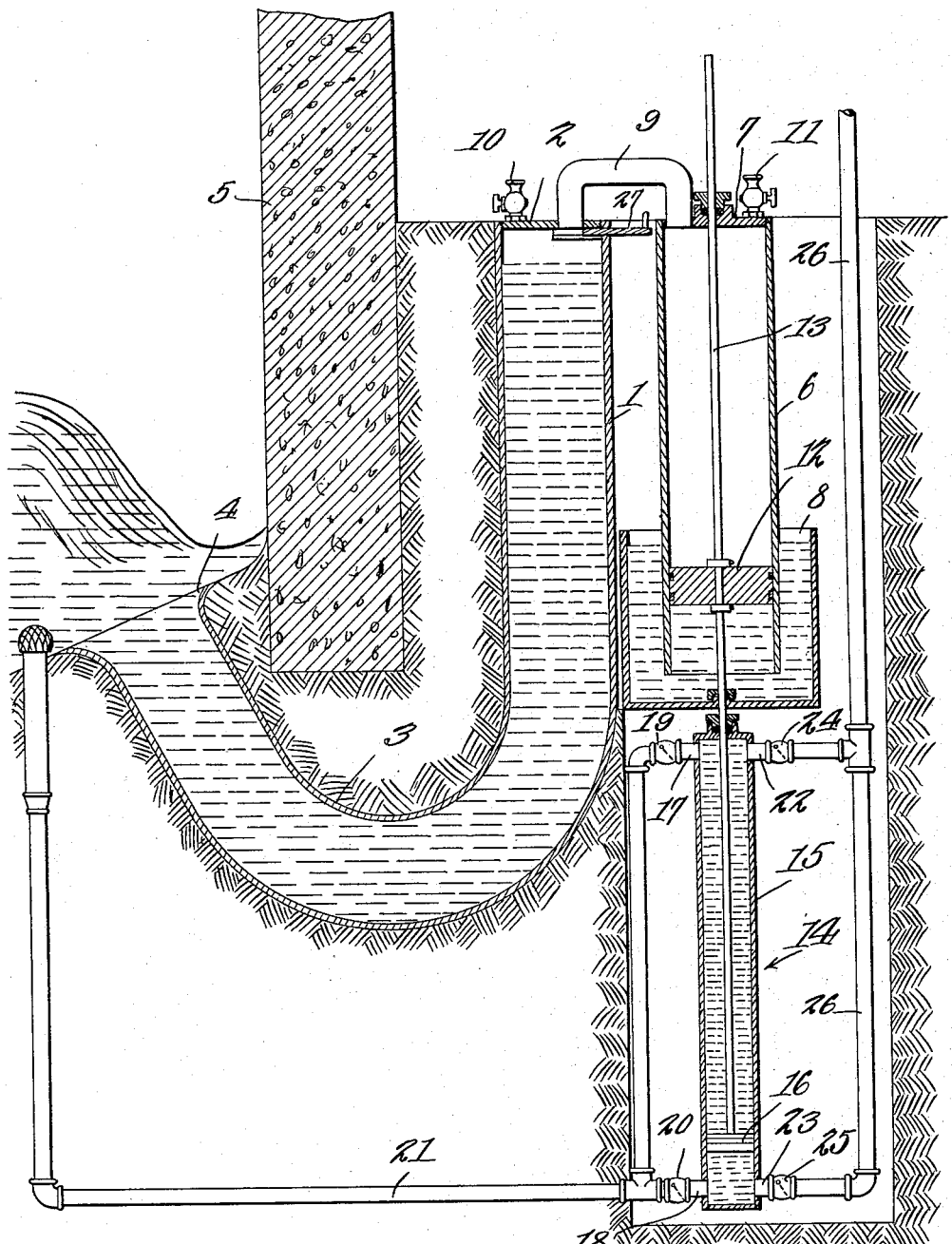

DAVID R. OLMSTED, OF COUNCIL BLUFFS, IOWA.

WAVE-MOTOR.

1,175,287.  Specification of Letters Patent. Patented Mar. 14, 1916.

Application filed June 18, 1915. Serial No. 34,882.

*To all whom it may concern:*

Be it known that I, DAVID R. OLMSTED, a citizen of the United States, residing at Council Bluffs, in the county of Pottawattamie and State of Iowa, have invented a new and useful Wave-Motor, of which the following is a specification.

The present invention appertains to wave motors, and is particularly an improvement over the wave motor disclosed in my Patent No. 1,077,156, issued October 28, 1913.

It is the object of the invention to provide a wave motor of novel and improved construction and operation, and adapted to be operated by the approaching and receding movements of the waves, and whereby motion is also obtained by the varying heights of the waves.

Another object of the invention is the provision of a unique means actuated by the waves, and adapted for operating the pump or other driven mechanism for utilizing the power created called the multiple.

A further object of the invention is the provision of a wave motor having a pump associated or combined therewith in a novel manner so as to be operated effectively for utilizing the dynamic energy derived from the movement of the waves.

It is also within the scope of the invention to provide a wave motor having the features above noted, which is also simple and inexpensive in construction, and which is practical and efficient in operation.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in its preferred embodiment in the accompanying drawing, wherein the figure is a vertical section of the improved wave motor.

In carrying out the invention, there is provided a stand pipe or upright conduit 1 having its upper end closed, as at 2, and having an outwardly and upwardly curved portion or trap 3 at its lower end terminating in a flared mouth 4. The stand pipe or conduit 1 is erected at the shore of the body of water, and the portion 3 extends to the bottom or bed of the body of water so as to lie below and receive the water therein, the stand pipe or conduit 1 projecting upwardly to a point above the highest crest level of the waves.

A sea wall 5 is preferably provided in front of the stand pipe or conduit 1, and in rear of the mouth 4 of the portion 3 for not only protecting that part of the present apparatus in rear of the sea wall, but to also enhance the operation of the apparatus, by stopping the waves above the mouth 4 of the portion 3, and causing the water to rush into the lower portion 3 of the stand pipe or conduit 1 with considerable force or momentum.

The vertical or up and down movement of the column of water within the stand pipe or conduit 1 is utilized for operating an actuating mechanism. This actuating mechanism comprises an upright cylinder 6 disposed at one side of and parallel with the stand pipe or conduit 1, and having its lower end open, while its upper end is closed, as at 7. The lower end of the cylinder 6 is submerged in a tank or reservoir 8 which is filled with water, and the water will therefore rise into the cylinder 6. The upper ends 2 and 7, respectively, of the stand pipe 1 and cylinder 6 are connected by means of a pipe 9 which establishes communication between the upper ends of the stand pipe and cylinder, and the upper ends of the stand pipe and cylinder are provided with the respective safety or air escape valves 10 and 11.

A piston 12 works within the cylinder 6 and is disposed slightly below the level of the water within the cylinder, whereby the piston will be carried upwardly and downwardly with the column of water within the cylinder. The piston 12 is attached to a vertical reciprocatory piston rod 13 which projects upwardly and downwardly from the piston and slides through the upper end of the cylinder 6 and the bottom of the tank 8, respectively.

The reciprocation of the rod 13 is utilized for operating a water pump 14, which embodies an upright cylinder 15 disposed below the tank 8 concentric or in alinement with the cylinder 6, and a piston 16 which operates within the cylinder 15 is attached to the lower end of the piston rod 13. Thus, both of the pistons 12 and 16 are carried by a common piston rod, and the upper cylinder 6 and piston 12 are of greater diameter than the lower cylinder 15 and piston 16, whereby the pump will be properly operated in the manner of a hydraulic ram.

The upper and lower ends of the pump cylinder 15 are provided with the inlet pipes 17 and 18, respectively, which are provided with the respective check valves 19 and 20, whereby the water may flow into the cylinder 15 through the valves 19 and 20 but cannot flow backwardly through the inlets. The inlet pipes 17 and 18 are connected to a suction or water supply pipe 21 which is extended to the body of water, as clearly suggested in the drawing, the pump cylinder 15 being disposed at a point below the normal or lowest level of the water, whereby the water will flow by gravity into the pump cylinder, to render the operation of the pump easy. The upper and lower ends of the pump cylinder are also provided with outlet pipes 22 and 23 having the check valves 24 and 25 which allow the water to pass through the outlets, and which prevent the return of the water back into the pump cylinder. The outlet pipes 22 and 23 are connected with a pipe 26 which extends upwardly to a tank or other device for receiving or utilizing the water pumped upwardly by the pump.

The cylinder 6, tank 8, and cylinder 15 are preferably, although not necessarily, mounted within a hole dug in the ground.

In operation, when the device is started, the first wave in passing over the mouth of the conduit or stand pipe 1 will cause the column of water with the stand pipe to rise, thus forcing the air from the upper end of the stand pipe into the cylinder 6, the valve 11 being opened to permit enough air to escape, so that only a normal pressure of air remains, in order that when the wave recedes, the column of water within the stand pipe 1 will fall by gravity. This will suck the air from the cylinder 6 thereby tending to create a vacuum, which will result in the atmospheric pressure at the base of the cylinder 6 forcing the column of water to ascend within the same. When the water is high in the stand pipe it is low in the cylinder 6, and vice versa, thereby resembling a see-saw. By the wave action over the mouth of the stand pipe or conduit 1, the great weight of the water is alternated between the stand pipe 1 and cylinder 6, as above indicated. The upward stroke of the water within the cylinder 6 is caused by atmospheric pressure, the falling of the column of water in the stand pipe 1, and the tendency to create a vacuum between the stand pipe and cylinder, and the downward stroke of the column of water within the cylinder is caused by the pressure of the air between the stand pipe and cylinder. The column of water within the cylinder 6 when rising will carry the piston 12 upwardly therewith, and this will move the piston 16 of the pump upwardly to eject the water from the upper end of the pump cylinder 15, and to allow the water to flow into the lower portion of the pump cylinder. When the next wave passes over and enters the trap portion 3 of the stand pipe 1, it will again raise the column of water within the stand pipe, and will force the air through the pipe 9 into the cylinder 6 for forcing the column of water downwardly within the cylinder 6, and to thereby move the piston 12 downwardly which will also force the pump piston 16 downwardly. The pump piston 16 being moved downwardly, will eject the water from the lower end of the pump cylinder, while the water will enter the upper end of the pump cylinder. The pump is double acting, so as to operate upon both the upward and downward strokes of the piston rod 13, and the water will be elevated or raised through the pipe 26 to a tank or other device utilizing the water. It will therefore be seen that the vertical movement of the column of water within the stand pipe is transmitted pneumatically to the column of water within the cylinder 6, for reciprocating the power piston 12, and the columns of water within the stand pipe and cylinder in counter balancing one another, render the operation of the device easy. The power piston 12 being submerged within the column of water within the cylinder 6, will be carried upwardly and downwardly properly with the said column of water, to operate the pump piston 16, and the pump cylinder 15 lying below the level of the waves or body of water will allow the water to flow into the pump cylinder by gravity which enables the pump to be operated with the least possible effort, and to thereby increase the efficiency of the motor.

A number of cylinders 6 may be connected to the upper end of the stand pipe 1 by means of a plurality of pipes 9, if it is desired to operate a number of pumps. A slide valve 27 may be employed for closing the pipe 9 for stopping all mechanical action.

Having thus described the invention, what is claimed as new is:

1. In a device of the character described, a stand pipe and upright cylinder having their upper ends connected and each containing a movable column of water; the lower end of the stand pipe having means for the passage of waves thereover and whereby a column of water in the stand pipe will be moved upwardly and downwardly, and a piston working within the cylinder and submerged within the respective column of water and adapted for actuating a driven device.

2. In a device of the character described, a stand pipe and upright cylinder, the lower end of the stand pipe having an upwardly curved portion for receiving waves thereover, the upper ends of the stand pipe and cylinder being in communication, a tank of water in which the lower end of the cylinder extends, the lower end of the cylinder being open, and the cylinder containing a column of water, and a piston working within said cylinder within said column of water and adapted for connection to a driven element.

3. In a device of the character described, a stand pipe and upright cylinder having their upper ends connected and each containing a movable column of water, the lower end of the stand pipe having means for the passage of waves thereover and for the passage of water therethrough to and from the stand pipe, a piston movable within the cylinder and submerged in the respective column of water, a pump cylinder disposed below the aforesaid cylinder, a piston working within the pump cylinder, and a common piston rod connecting the two pistons.

4. In a device of the character described, a stand pipe and upright cylinder having their upper ends connected together for communication therebetween, the stand pipe having means at its lower end for the passage of waves thereover and to permit the water to flow into and out of the stand pipe, a water tank into which the lower end of the cylinder projects, the lower end of the cylinder being open, the cylinder having a vertically movable column of water therein, a piston working within the cylinder within said column of water, a pump cylinder disposed below said tank, a piston working within the pump cylinder, and a common piston rod connecting said pistons and sliding through the bottom of said tank and the upper end of the pump cylinder.

In testimony that I claim the foregoing as my own, I have hereto affixed my signature in the presence of two witnesses.

DAVID R. OLMSTED.

Witnesses:
L. R. TROTTER,
ROY PETERSON.

Copies of this patent may be obtained for five cents each, by addressing the "Commissioner of Patents, Washington, D. C."